United States Patent
Kim

(10) Patent No.: US 11,713,070 B2
(45) Date of Patent: Aug. 1, 2023

(54) APPARATUS AND METHOD FOR CONTROLLING STEERING OF AUTONOMOUS VEHICLE

(71) Applicant: HYUNDAI MOBIS CO., LTD, Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 166 days.

(21) Appl. No.: 17/400,341

(22) Filed: Aug. 12, 2021

(65) Prior Publication Data
US 2022/0063716 A1 Mar. 3, 2022

(30) Foreign Application Priority Data
Aug. 25, 2020 (KR) .................. 10-2020-0107116

(51) Int. Cl.
| | | |
|---|---|---|
| B62D 6/00 | (2006.01) | |
| B60W 60/00 | (2020.01) | |
| B62D 15/02 | (2006.01) | |

(52) U.S. Cl.
CPC ............. *B62D 6/00* (2013.01); *B60W 60/001* (2020.02); *B62D 15/025* (2013.01); *B60W 2520/10* (2013.01); *B60W 2520/12* (2013.01); *B60W 2540/18* (2013.01); *B60W 2710/20* (2013.01)

(58) Field of Classification Search
CPC ......... B60W 2510/20; B60W 2540/18; B60W 2710/20; B60W 2050/0215; G01B 21/22; G01P 3/481
See application file for complete search history.

(56) References Cited

U.S. PATENT DOCUMENTS

| | | | | |
|---|---|---|---|---|
| 2012/0296528 A1* | 11/2012 | Wellhoefer | .............. | B60Q 9/00 74/552 |
| 2019/0263446 A1* | 8/2019 | Tsubaki | ................... | B62D 6/00 |
| 2019/0300044 A1* | 10/2019 | Tsubaki | ................... | B62D 5/04 |

FOREIGN PATENT DOCUMENTS

KR  10-2017-0065793 A   6/2017

* cited by examiner

*Primary Examiner* — Jeff A Burke
*Assistant Examiner* — Jerrod Irvin Davis
(74) *Attorney, Agent, or Firm* — NSIP Law

(57) ABSTRACT

Disclosed are apparatuses and methods for controlling the steering of an autonomous vehicle. The apparatus including an electric power steering device to generate an assist torque for a steering wheel, an autonomous driving position controller to control a steering position according to a command steering angle input from an autonomous driving module, a driver steering intervention judger to judge whether a driver intervenes in steering based on a column torque and a vehicle speed, a weight detector to detect a weight for integrating output of an electric power steering device and output of an autonomous driving position controller based on judging whether the driver intervenes in steering, and an output controller to apply the weight to the output of the electric power steering device and the output of the autonomous driving position controller to integrate the output of the electric power steering device and the output of the autonomous driving position controller, wherein the autonomous driving position controller is further configured to adjust a gain value for controlling the steering position by applying the weight.

14 Claims, 2 Drawing Sheets

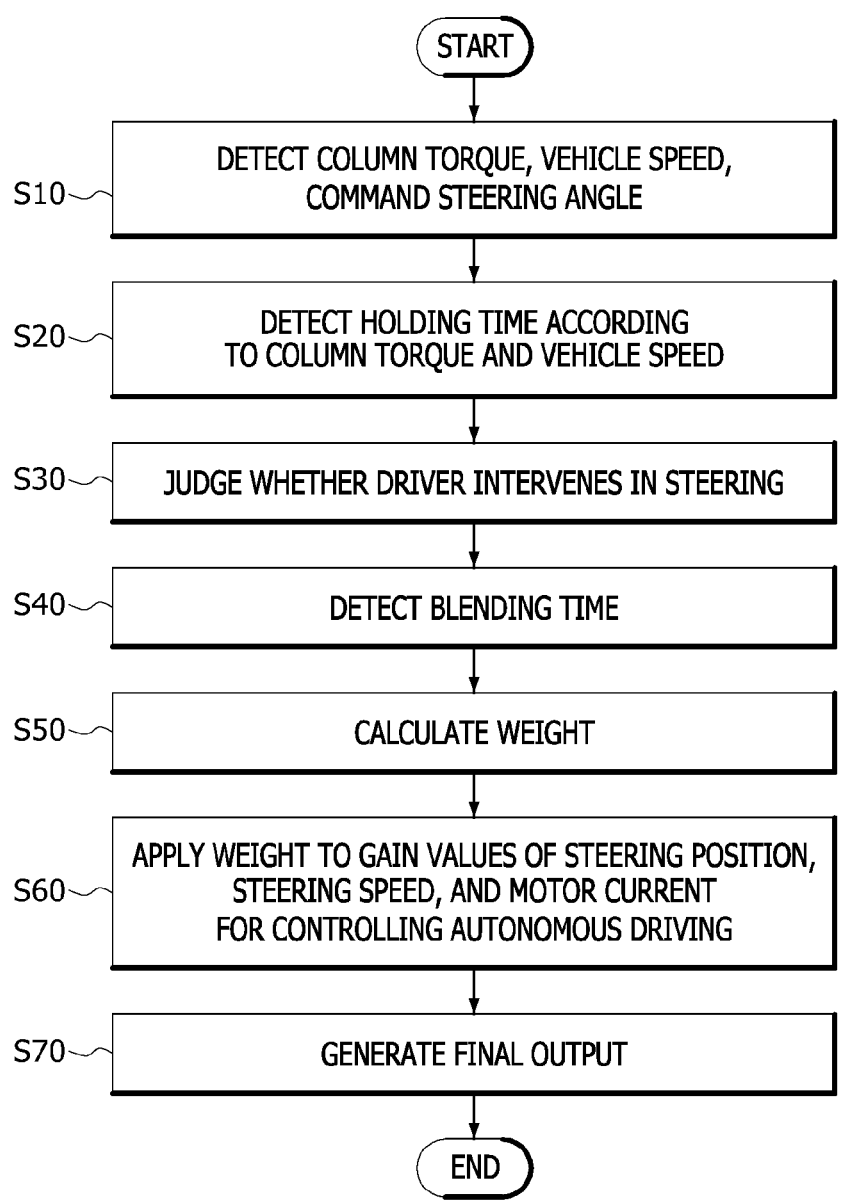

APPARATUS AND METHOD FOR CONTROLLING STEERING OF AUTONOMOUS VEHICLE

CROSS-REFERENCE TO RELATED APPLICATION

This application the benefit under 35 USC § 119(a) of Korean Patent Application No. 10-2020-0107116, filed on Aug. 25, 2020, in the Korean Intellectual Property Office, the entire disclosure of which is incorporated herein by reference for all purposes.

BACKGROUND

Field

Exemplary embodiments of the present disclosure relate to an apparatus and a method for controlling the steering of an autonomous vehicle, and more particularly, to an apparatus and a method for controlling the steering of an autonomous vehicle, which improve a sense of difference in steering that occurs in a steering mode transition process from an autonomous driving mode to a manual mode when there is a driver's steering intervention during autonomous driving.

Discussion of Related Art

Power steering of a vehicle is a power-based steering device and serves to assist a driver in operating a steering wheel. Such power steering mainly uses hydraulic pressure, but recently, the use of an electric power steering (motor driven power steering (MDPS)) system using the power of a motor is increasing. This is because the MDPS system has advantages in that it is light, occupies less space, and does not require oil exchange as compared with the existing hydraulic power steering system.

The MDPS system judges vehicle driving conditions through a torque sensor that measures the steering torque of a driver inputted to a steering wheel, a steering angle sensor that measures a steering angle or steering angular velocity of the steering wheel, a vehicle speed sensor that measures a vehicle speed, and the like, and provides an auxiliary torque through an electric motor on the basis of the steering torque applied to a steering shaft as the driver steers the steering wheel.

Meanwhile, an autonomous vehicle recognizes environments of a road, on which the vehicle is running, through an autonomous driving module in an autonomous driving mode, and determines a command steering angle and a command torque required for an operation of the MDPS system, thereby controlling the operation of the MDPS system applied to the autonomous vehicle.

At this time, there may occur a situation in which a driver needs to steer a steering wheel at his/her will as needed, such as the occurrence of a sudden failure in the autonomous driving module and requirement of manual steering for emergency avoidance driving. In such a case, when a steering torque is substantially maintained at a predetermined level or higher for a predetermined time or more, the MDPS system in the related art has operated to cancel the autonomous driving mode by judging that the driver's steering intervention has occurred.

The background art of the present disclosure is disclosed in Korean Patent Application Laid-Open No. 10-2017-0065793 (published on Jun. 14, 2017).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus to control steering of an autonomous vehicle, the apparatus including an electric power steering device configured to generate an assist torque to assist rotation of a steering wheel on the basis of a column torque, an autonomous driving position controller configured to control a steering position according to a command steering angle input from an autonomous driving module, a driver steering intervention judger configured to judge whether a driver intervenes in steering based on the column torque and a vehicle speed, a weight detector configured to detect a weight for integrating output of the electric power steering device and output of the autonomous driving position controller based on judging whether the driver intervenes in steering, and an output controller configured to apply the weight to the output of the electric power steering device and to the output of the autonomous driving position controller to integrate the output of the electric power steering device and the output of the autonomous driving position controller, wherein the autonomous driving position controller is further configured to adjust a gain value for controlling the steering position by applying the weight.

The apparatus may include a noise remover configured to check a level of the column torque and to remove a resonance frequency due to resonance of a torsion bar.

The driver steering intervention judger may include a holding time detector configured to detect a holding time during which a driver intervenes in steering, on the basis of the column torque and the vehicle speed, and a reference judger configured to judge whether the driver intervenes in steering based on the holding time satisfying a threshold.

The reference judger may be configured to judge that the driver intervenes in steering, in response to the column torque being continued at a setting level or higher for more than or equal to a setting time.

The weight detector may include a blending time detector configured to detect a blending time according to a magnitude of the column torque at a time of judging whether the driver intervenes in steering, and a weight calculator configured to calculate the weight based on the blending time and an accumulated time that is accumulated from a time the driver intervenes in steering.

The weight may be obtained by dividing a result of subtracting the accumulated time from the blending time by the blending time.

The autonomous driving position controller may include a position controller for controlling a rotation position of the steering wheel or a wheel, a speed controller for controlling a rotation speed of the steering wheel or the wheel, and a current controller for controlling a motor current for rotating the steering wheel or the wheel, wherein the weight is applied to a gain value of the position controller and a gain value of the speed controller to reduce an output of the position controller and an output of the speed controller.

In another general aspect, there is provided a method for controlling steering of an autonomous vehicle, the method including judging whether a driver intervenes in steering based on a column torque and a vehicle speed, detecting a weight for integrating an output of an electric power steering device and an output of an autonomous driving position controller based on judging whether the driver intervenes in steering, adjusting the output of the autonomous driving position controller by adjusting a gain value for controlling a steering position through the weight, and applying the weight to the output of the electric power steering device and to the output of the autonomous driving position controller to integrate the output of the electric power steering device and the output of the autonomous driving position controller.

The judging of whether the driver intervenes in steering may include detecting a holding time during which a driver intervenes in steering, on the basis of the column torque and the vehicle speed, and judging whether the driver intervenes in steering based on the holding time satisfying a threshold.

The judging of whether the driver intervenes in steering may include judging that the driver intervenes in steering in response to the column torque being continued at a setting level or higher for more than or equal to a setting time.

The step of detecting the weight may include detecting a blending time according to a magnitude of the column torque at a time of judging whether the driver intervenes in steering, and calculating the weight based on the blending time and an accumulated time accumulated that is accumulated from a time the driver intervenes in steering.

The weight may be obtained by dividing a result of subtracting the accumulated time from the blending time by the blending time.

The adjusting of the output of the autonomous driving position controller may include reducing the output of the autonomous driving position controller by adjusting a gain value of a position controller for controlling a rotation position of the steering wheel or a wheel and a gain value of a speed controller for controlling a rotation speed of the steering wheel or the wheel.

Other features and aspects will be apparent from the following detailed description, the drawings, and the claims.

BRIEF DESCRIPTION OF THE DRAWINGS

FIG. 2 is a flowchart for explaining a method for controlling the steering of an autonomous vehicle in accordance with an embodiment of the present disclosure.

Figure 1:
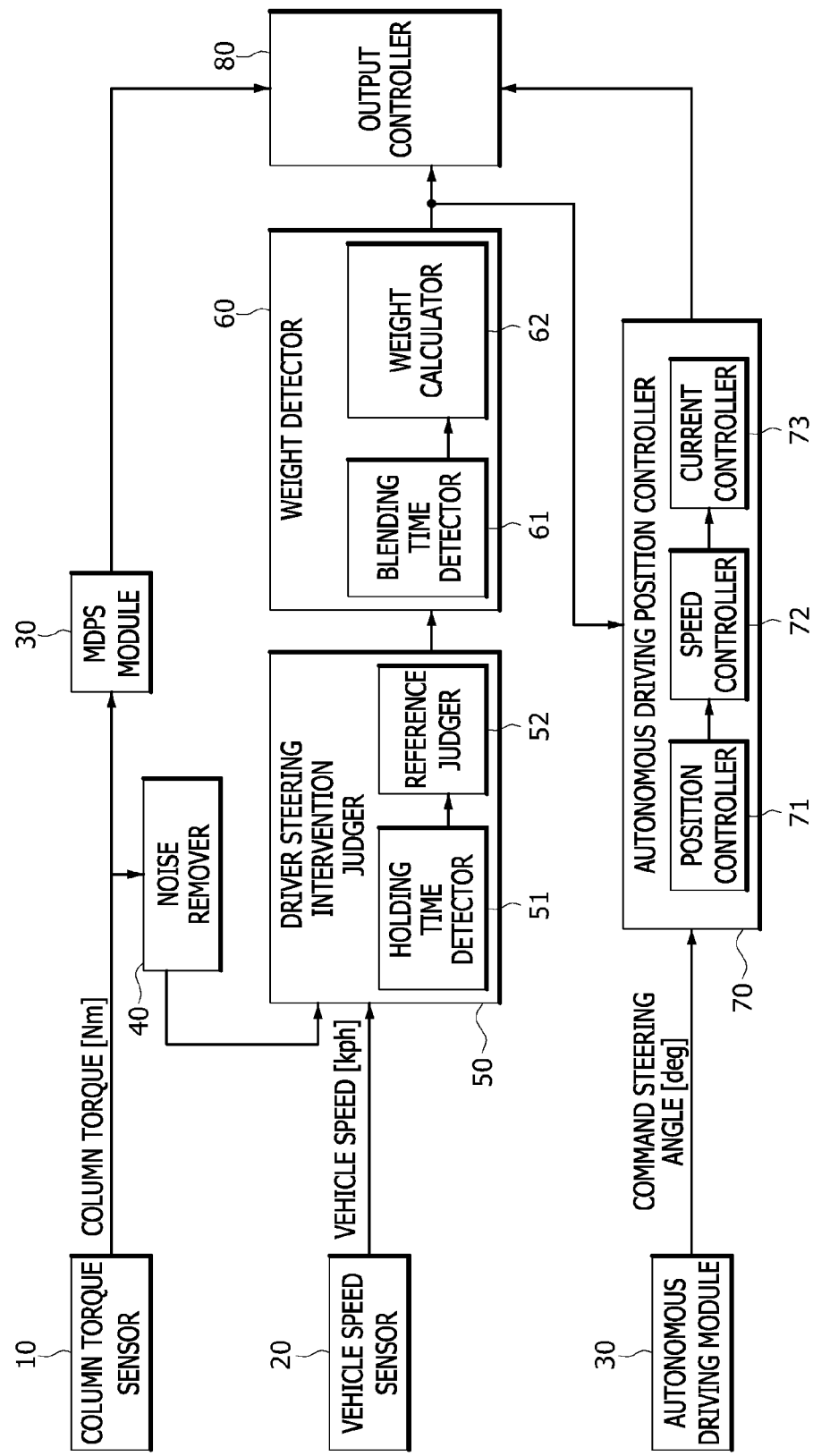
FIG. 1 is a block configuration diagram of an apparatus for controlling the steering of an autonomous vehicle in accordance with an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE ILLUSTRATED EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a block configuration diagram of an apparatus for controlling the steering of an autonomous vehicle in accordance with an embodiment of the present disclosure.

Referring to FIG. 1, the apparatus for controlling the steering of an autonomous vehicle in accordance with an embodiment of the present disclosure includes a column torque sensor 10, a vehicle speed sensor 20, an autonomous driving module 30, an electric power steering device, a noise remover 40, a driver steering intervention judger 50, a weight detector 60, an output controller 80, and an autonomous driving position controller 70.

The column torque sensor 10 senses a steering torque of a driver inputted to a steering wheel.

The vehicle speed sensor 20 senses a vehicle speed of a vehicle.

The autonomous driving module 30 performs speed control and distance maintenance control by using information on the speed limit of a road on which the vehicle is driven, the curvature and slope of a path, a distance to a proceeding vehicle, and the like, and performs steering angle tracking control in order to track the path. To this end, the autonomous driving module 30 outputs a command steering angle on the basis of various information related to vehicle driving.

The electric power steering device generates an assist torque for assisting the rotation of the steering wheel on the basis of column torque. That is, the electric power steering device judges driving conditions of the vehicle through a steering torque of a driver inputted to the steering wheel, a steering angle or steering angular velocity of the steering wheel, a vehicle speed, and the like, and provides the assist torque on the basis of the steering torque applied to a steering shaft as the driver steers the steering wheel.

As the electric power steering device, a motor driven power steering (MDPS) module may be employed; however, the present disclosure is not limited thereto and examples of the electric power steering device may include various steering devices including electric power steering (EPS). In the present embodiment, the MDPS module 30 will be described as an example.

The noise remover 40 checks the level of the column torque and removes a resonance frequency due to the resonance of a torsion bar.

Typically, during autonomous driving, the level of the column torque may be checked to judge whether a driver intervenes in steering. In such a case, the level of the column torque may be significantly increased due to the resonance of a torsion bar (not illustrated) in unintentional situations, for example, when a vehicle passes through a pot hole or a steering wheel is unintentionally touched. Such an increase in the column torque may lead to unintentional cancellation of an autonomous driving mode.

In this regard, the noise remover 40 checks the level of the column torque and removes the resonance frequency due to the resonance of the torsion bar, thereby substantially preventing the autonomous driving mode from being cancelled by an unintentional increase in the level of the column torque.

The noise remover 40 may include at least one of a band pass filter (band stop filter), a notch filter, and a lead-lag compensator.

The driver steering intervention judger 50 judges whether the driver intervenes in steering on the basis of the column torque and the vehicle speed.

The driver steering intervention judger 50 includes a holding time detector 51 and a reference judger 52.

The holding time detector 51 detects a holding time during which the driver has intervened in steering, on the basis of the column torque and the vehicle speed. A setting time for judging the driver's steering intervention increases as the vehicle speed increases and decreases as the magnitude of the column torque increases. The holding time detector 51 receives the values of the vehicle speed and the column torque, forms a map table through a lookup table, and calculates the holding time for judging the driver's steering intervention.

The reference judger 52 judges whether the driver intervenes in steering according to whether a preset setting reference or a threshold based on the holding time is satisfied. The reference judger 52 judges whether the driver intervenes in steering according to whether the level of the column torque is continued at a preset setting level or higher for a preset setting time or more, and judges that the driver intervenes in steering when the column torque is continued at the setting level or higher for the preset setting time or more.

The weight detector 60 detects a weight for integrating the output of the MDPS module 30 and output of the autonomous driving position controller 70 according to the result of judging whether the driver intervenes in steering.

The weight detector 60 includes a blending time detector 61 and a weight calculation section 62.

The blending time detector 61 detects a blending time according to the magnitude of the column torque at the time of judging whether the driver intervenes in steering.

The time point at which the driver's steering intervention or non-intervention has been judged is the time point at which it has been judged that the driver intervenes in steering.

The blending time is a time for integrating the output of the MDPS module 30 and the output of the autonomous driving position controller 70. The blending time decreases as the magnitude of the column torque increases and increases as the magnitude of the column torque decreases.

The weight calculator 62 calculates the weight through the blending time and an accumulated time accumulated from the time point at which it has been judged whether the driver intervenes in steering.

The accumulated time is an accumulated time counted from the time point at which it has been judged whether the driver intervenes in steering.

In more detail, the weight calculator 62 calculates the weight by dividing a value, which is obtained by subtracting the accumulated time from the blending time, by the blending time. That is, the weight is (blending time-accumulated time)/blending time.

Meanwhile, the output controller 80 may be applied to an exponential smoothing filter. In such a case, the output controller 80 generates final output through $O=A \times G+(1-G) \times B$. In the Equation above, G denotes a weight, A denotes the output of the autonomous driving position controller 70, and B denotes the output of the MDPS module 30.

In the Equation above, when the weight is changed from 1 to 0, the final output is changed by 100% to 0% from A to B.

However, even though the weight is changed, the output of the autonomous driving position controller 70 is feedback-controlled. Thus, position tracking may not be properly performed, resulting in an increase in the final output. That is, when the driver intervenes in steering, the autonomous driving position controller 70 further increases output to move the vehicle to a target position. In such a case, a sense of difference may occur at the time point at which the output of the MDPS module 30 and the output of the autonomous driving position controller 70 are integrated.

In this regard, the autonomous driving position controller 70 receives the above weight, applies the weight to a gain value for adjusting a steering position, and reduces the output thereof.

That is, the autonomous driving position controller 70 includes a position controller 71 for controlling a rotation position of the steering wheel or a wheel, a speed controller 72 for controlling a rotation speed of the steering wheel or the wheel, and a current controller 73 for controlling a motor current for rotating the steering wheel or the wheel.

The position controller 71 and the speed controller 72 uses gain values set thereto in order to control the rotation position of the steering wheel or the wheel, and adjust the gain values by applying the inputted weight to the gain values as described above. Accordingly, the output of the autonomous driving position controller 70 is reduced and inputted to the output controller 80.

The output controller 80 applies the weight to the output of the MDPS module 30 and the output of the autonomous driving position controller 70, thereby generating the final output in which the output of the MDPS module 30 and the reduced output of the autonomous driving position controller 70 are integrated.

The output controller 80 may be applied to the exponential smoothing filter as described above, and generates the final output through $O=A \times G+(1-G) \times B$.

That is, the output of the autonomous driving position controller 70 is reduced at the time point at which the final output is generated by the output controller 80, so that a sense of difference is significantly improved at the time of blending. Furthermore, the weight is applied at substantially the same timing during the generation of the final output and the operation of the autonomous driving position controller 70, so that output blending processing can be performed more stably.

Consequently, the autonomous driving mode can be substantially maintained as much as possible, and the steering mode may transition in a state in which a sense of difference is minimized when the driver intervenes in steering.

Hereinafter, a method for controlling the steering of an autonomous vehicle in accordance with an embodiment of the present disclosure will be described in detail with reference to FIG. 2.

FIG. 2 is a flowchart for explaining the method for controlling the steering of an autonomous vehicle in accordance with an embodiment of the present disclosure.

Referring to FIG. 2, the column torque sensor 10 senses a steering torque of a driver inputted to the steering wheel, the vehicle speed sensor 20 senses the vehicle speed of the vehicle, and the autonomous driving module 30 detects a command steering angle on the basis of various information related to vehicle driving (S10).

Meanwhile, the MDPS module 30 judges the driving conditions of the vehicle through the steering torque of the driver inputted to the steering wheel, the steering angle or the steering angular velocity of the steering wheel, the vehicle speed, and the like, and generates an assist torque on the basis of the steering torque applied to the steering shaft as the driver steers the steering wheel. Subsequently, the noise remover 40 checks the level of a column torque and removes a resonance frequency due to the resonance of the torsion bar.

Meanwhile, the holding time detector 51 detects the holding time during which the driver has intervened in steering, on the basis of the column torque and the vehicle speed inputted from the column torque sensor 10 and the vehicle speed sensor 20, respectively (S20).

Subsequently, the reference judger 52 judges whether the driver intervenes in steering according to whether a preset setting reference based on the holding time detected by the holding time detector 51 is satisfied (S30). In such a case, the reference judger 52 judges that the driver intervenes in steering when the column torque is continued at the setting level or higher for the preset setting time or more.

As the reference judger 52 judges that the driver intervenes in steering, the blending time detector 61 detects the blending time according to the magnitude of the column torque at the time of judging whether the driver intervenes in steering (S40).

Subsequently, the weight calculator 62 calculates the weight through the blending time and the accumulated time accumulated from the time point at which it has been judged whether the driver intervenes in steering (S50). In such a case, the weight calculator 62 calculates the weight by dividing the value, which is obtained by subtracting the accumulated time from the blending time, by the blending time.

As the weight is calculated, each of the position controller 71 and the speed controller 72 in the autonomous driving position controller 70 applies the weight to the gain value set thereto in order to control the rotation position of the steering wheel or the wheel, thereby adjusting the gain value (S60). Accordingly, the output of the autonomous driving position controller 70 is reduced.

Subsequently, the output controller 80 applies the weight to the output of the MDPS module 30 and the output of the autonomous driving position controller 70, thereby generating the final output in which the output of the MDPS module 30 and the reduced output of the autonomous driving position controller 70 are integrated (S70).

An apparatus and a method for controlling the steering of an autonomous vehicle in accordance with an embodiment of the present disclosure provide a driver with a smooth steering feel by improving a sense of difference in steering that occurs in a steering mode transition process from an autonomous driving mode to a manual mode when there is a driver's steering intervention during autonomous driving.

Furthermore, the apparatus and the method for controlling the steering of an autonomous vehicle in accordance with an embodiment of the present disclosure substantially prevent an unintentional steering mode transition due to unintentional steering by improving the accuracy of a driver's steering intervention.

In addition, the apparatus and the method for controlling the steering of an autonomous vehicle in accordance with an embodiment of the present disclosure improve autonomous driving safety by quickly transitioning a steering mode in the case of an emergency such as a failure of an autonomous driving system.

The implementations described in the present specification may be implemented as a method or process, an apparatus, a software program, a data stream or signal, for example. Although discussed only in the context of a single form of implementation (for example, discussed only as a method), the discussed features may also be implemented as other forms (for example, an apparatus or a program). The apparatus may be implemented as appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistant (PDA), and other devices that facilitate communication of information between end users.

The above-described apparatus and method for controlling the steering of an autonomous vehicle, improves a sense of difference in steering that occurs in a steering mode transition process from an autonomous driving mode to a manual mode when there is a driver's steering intervention during autonomous driving.

An apparatus and a method for controlling the steering of an autonomous vehicle in accordance with the present disclosure provide a driver with a smooth steering feel by improving a sense of difference in steering that occurs in a steering mode transition process from an autonomous driving mode to a manual mode when there is a driver's steering intervention during autonomous driving.

The apparatus and the method for controlling the steering of an autonomous vehicle in accordance with the present disclosure substantially prevent an unintentional steering mode transition due to unintentional steering by improving the accuracy of a driver's steering intervention.

The apparatus and the method for controlling the steering of an autonomous vehicle in accordance with the present disclosure improve autonomous driving safety by quickly transitioning a steering mode in the case of an emergency such as a failure of an autonomous driving system.

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to control steering of an autonomous vehicle, the apparatus comprising:
   an electric power steering device configured to generate an assist torque to assist rotation of a steering wheel on a basis of a column torque;
   an autonomous driving position controller configured to control a steering position according to a command steering angle input from an autonomous driving module;

a driver steering intervention judger configured to judge whether a driver intervenes in steering based on the column torque and a vehicle speed;

a blending time detector configured to detect a blending time according to a magnitude of the column torque at a time of the judging whether the driver intervenes in steering;

a weight calculator configured to calculate a weight for integrating an output of the electric power steering device and an output of the autonomous driving position controller, wherein the integrating is based on the blending time and an accumulated time that is accumulated from the time the driver intervenes in the steering; and an output controller configured to apply the weight to the output of the electric power steering device and to the output of the autonomous driving position controller to integrate the output of the electric power steering device and the output of the autonomous driving position controller, wherein the autonomous driving position controller is further configured to adjust a gain value for controlling the steering position by applying the weight.

2. The apparatus according to claim 1, further comprising:
a noise remover configured to check a level of the column torque and to remove a resonance frequency due to resonance of a torsion bar.

3. The apparatus according to claim 1, wherein the driver steering intervention judger comprises:
a holding time detector configured to detect a holding time during which a driver intervenes in steering, on the basis of the column torque and the vehicle speed; and
a reference judger configured to judge whether the driver intervenes in steering based on the holding time satisfying a threshold.

4. The apparatus according to claim 3, wherein the reference judger is further configured to judge that the driver intervenes in steering, in response to the column torque being continued at a setting level or higher for more than or equal to a setting time.

5. The apparatus according to claim 1, wherein the weight is obtained by dividing a result of subtracting the accumulated time from the blending time by the blending time.

6. The apparatus according to claim 1, wherein the autonomous driving position controller comprises:
a position controller for controlling a rotation position of the steering wheel or a wheel;
a speed controller for controlling a rotation speed of the steering wheel or the wheel; and
a current controller for controlling a motor current for rotating the steering wheel or the wheel,
wherein the weight is applied to a gain value of the position controller and a gain value of the speed controller to reduce an output of the position controller and an output of the speed controller.

7. A method for controlling steering of an autonomous vehicle, the method comprising:
judging whether a driver intervenes in steering based on a column torque and a vehicle speed;
detecting a blending time according to a magnitude of the column torque at a time of judging whether the driver intervenes in steering; and
calculating a weight
for integrating an output of an electric power steering device and an output of an autonomous driving position controller based on the blending time and an accumulated time accumulated that is accumulated from a time the driver intervenes in steering;
adjusting the output of the autonomous driving position controller by adjusting a gain value for controlling a steering position through the weight; and
applying the weight to the output of the electric power steering device and to the output of the autonomous driving position controller to integrate the output of the electric power steering device and the output of the autonomous driving position controller.

8. The method according to claim 7, wherein the judging of whether the driver intervenes in steering comprises:
detecting a holding time during which a driver intervenes in steering, on a basis of the column torque and the vehicle speed; and
judging whether the driver intervenes in steering based on the holding time satisfying a threshold.

9. The method according to claim 8, wherein the judging of whether the driver intervenes in steering comprises judging that the driver intervenes in steering in response to the column torque being continued at a setting level or higher for more than or equal to a setting time.

10. The method according to claim 7, wherein the weight is obtained by dividing a result of subtracting the accumulated time from the blending time by the blending time.

11. The method according to claim 7, wherein, the adjusting of the output of the autonomous driving position controller comprises reducing the output of the autonomous driving position controller by adjusting a gain value of a position controller for controlling a rotation position of a steering wheel or a wheel and a gain value of a speed controller for controlling a rotation speed of the steering wheel or the wheel.

12. A non-transitory computer-readable storage medium storing instructions that, when executed by a processor, cause the processor to perform the method for controlling steering of the autonomous vehicle of claim 7.

13. An electronic apparatus, the apparatus comprising:
an autonomous driving module configured to control a steering position of an electronic power steering device;
an autonomous driving position controller configured to control the steering position according to a command steering angle input from the autonomous driving module;
a driver steering intervention judger configured to determine a driver steering intervention occurrence in an operation of the autonomous driving module based on a column torque and a vehicle speed;
a blending time detector configured to detect a blending time according to a magnitude of the column torque at a time of determining of the driver steering intervention occurrence;
a weight calculator configured to calculate a weight for integrating a first output of the electric power steering device and a second output of the autonomous driving position controller, the weight being based on the blending time and an accumulated time that is accumulated from the time the driver steering intervention occurrence is determined; and
an output controller configured to apply the weight to the autonomous driving position controller and the autonomous driving module for the control of the command steering angle and the steering position.

14. The apparatus of claim 13, wherein the autonomous driving position controller is further configured to adjust a gain value for controlling the steering position by applying the weight.

* * * * *